United States Patent [19]

Schonlau

[11] Patent Number: 4,990,839
[45] Date of Patent: Feb. 5, 1991

[54] MODULAR ROBOTIC SYSTEM

[76] Inventor: William J. Schonlau, 28127 Ridgepoint Ct., Rancho Palos Verdes, Calif. 90274

[21] Appl. No.: 281,625

[22] Filed: Dec. 9, 1988

[51] Int. Cl.$^5$ ............................................... G05B 13/00
[52] U.S. Cl. ........................... 318/568.1; 318/568.17; 318/573; 318/568.15; 364/513; 901/22
[58] Field of Search .................. 901/2, 14, 15, 19, 23, 901/24, 25, 27, 28, 29, 22; 318/560–634; 364/513

[56] References Cited

U.S. PATENT DOCUMENTS

| | | | |
|---|---|---|---|
| 4,201,937 | 5/1980 | Irie | 318/568.15 X |
| 4,308,584 | 12/1981 | Arai | 901/15 X |
| 4,385,358 | 5/1983 | Ito et al. | 318/573 X |
| 4,467,436 | 8/1984 | Chance et al. | 364/513 |
| 4,514,814 | 4/1985 | Evans | 364/474.11 |
| 4,517,653 | 5/1985 | Tsuchihashi et al. | 364/513 |
| 4,561,816 | 12/1985 | Dingess | 901/22 X |
| 4,578,764 | 3/1986 | Hutchins et al. | 364/513 |
| 4,617,502 | 10/1986 | Sakaue et al. | 318/636 X |
| 4,621,332 | 11/1986 | Sugimoto et al. | 318/568.17 X |
| 4,638,223 | 1/1987 | Tajima et al. | 318/254 |
| 4,641,251 | 2/1987 | Inoue | 364/513 |
| 4,664,588 | 5/1987 | Newell et al. | 901/41 X |

Primary Examiner—William M. Shoop, Jr.
Assistant Examiner—Paul Ip
Attorney, Agent, or Firm—Kelly Bauersfeld & Lowry

[57] ABSTRACT

A modular robotic system is provided with one or more robotic arm sets constructed from modular components and controlled by a central processor to displace an end effector or tool through a desired movement or movements as a function of time. Each arm set comprises a custom assembled combination of passive and active members of selected sizes and shapes, wherein each active member includes a drive motor for rotating a driven member with one degree of mechanical freedom. The active members of each arm set are connected to the central processor via a common communications cable for receiving position commands in the form of end effector position signals. The active members include individual on-board microprocessors for translating each end effector position signal to obtain individualized displacements of the active members which, in combination, result in the desired end effector displacement.

11 Claims, 6 Drawing Sheets

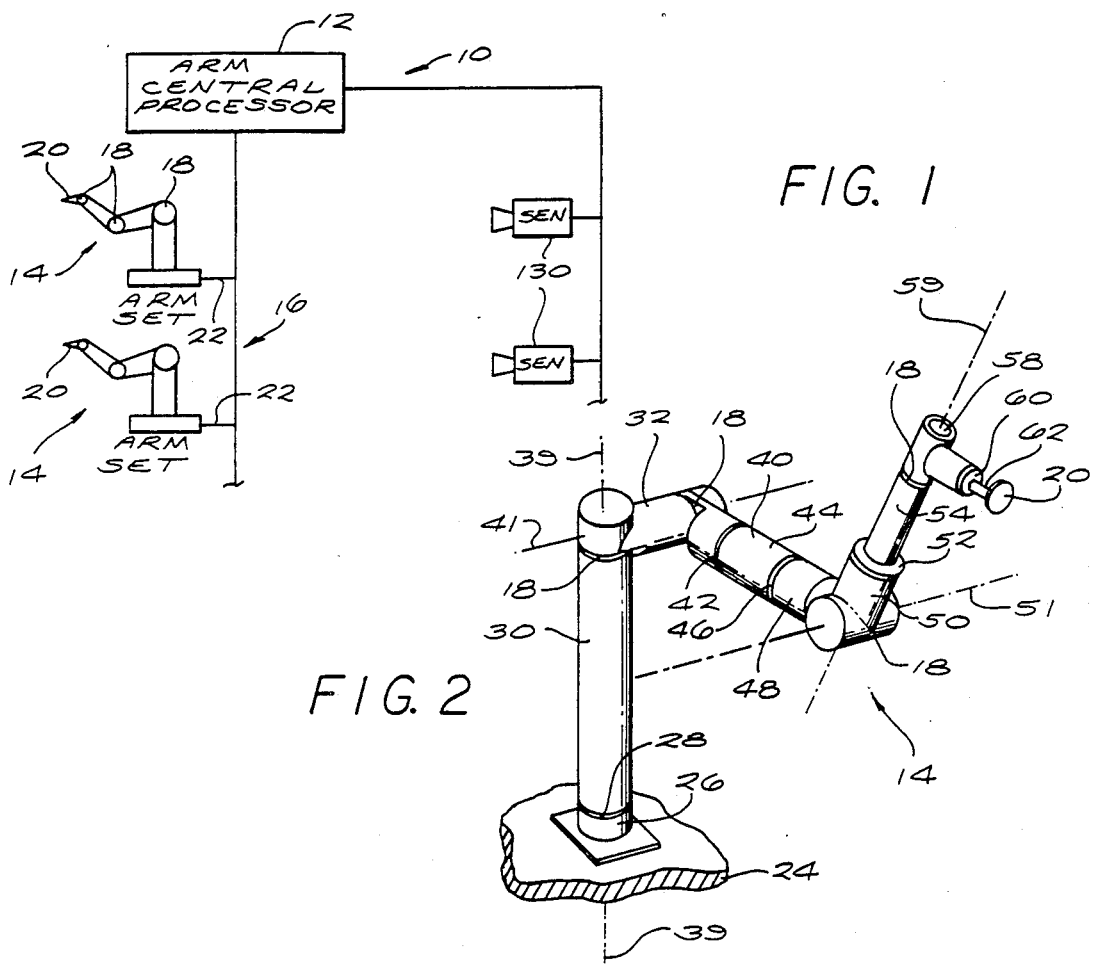

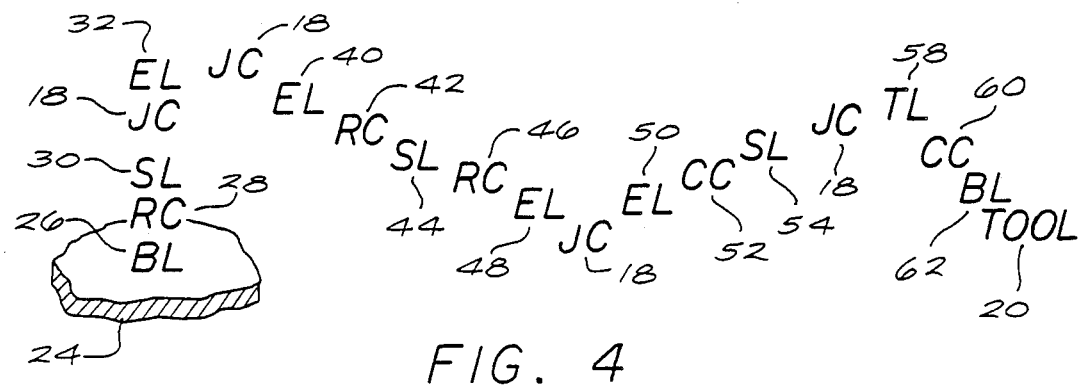
FIG. 4
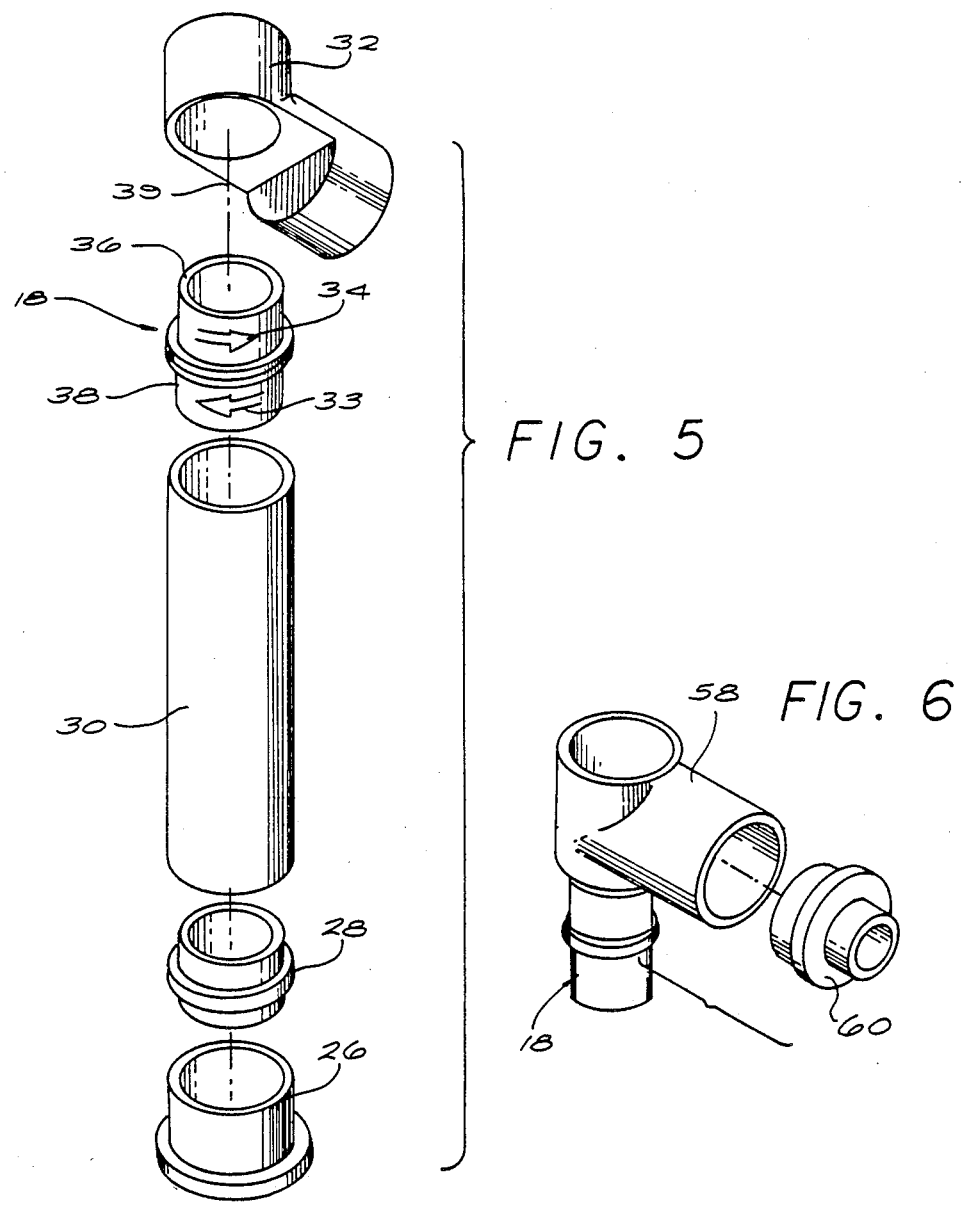
FIG. 5
FIG. 6

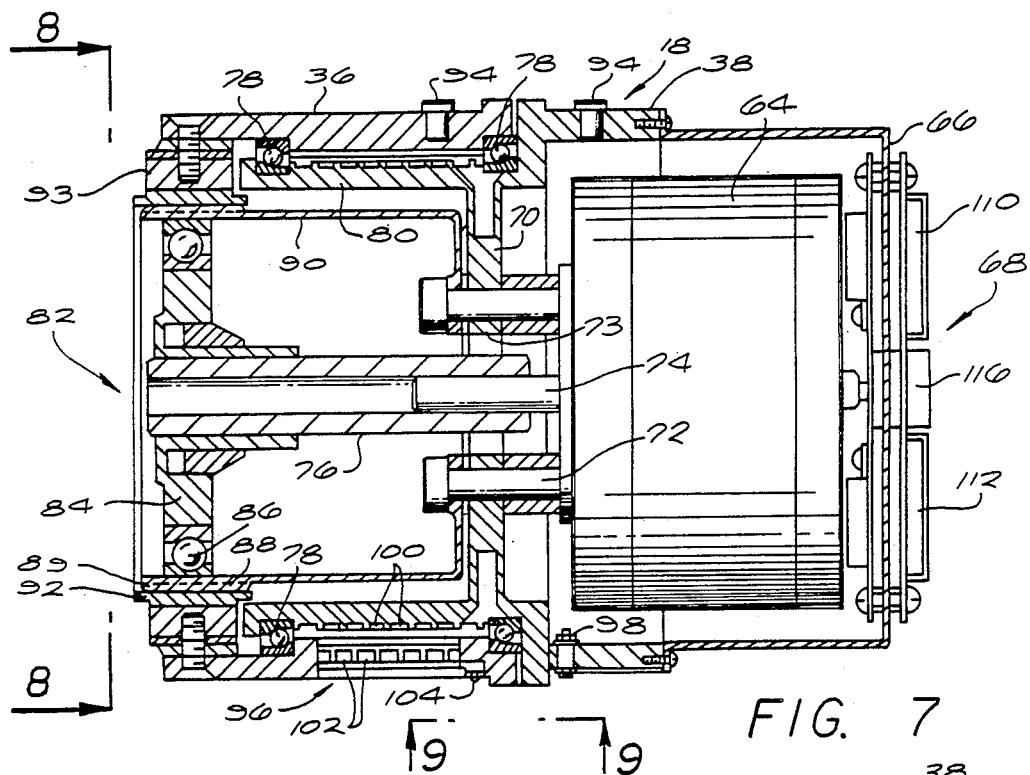
FIG. 7
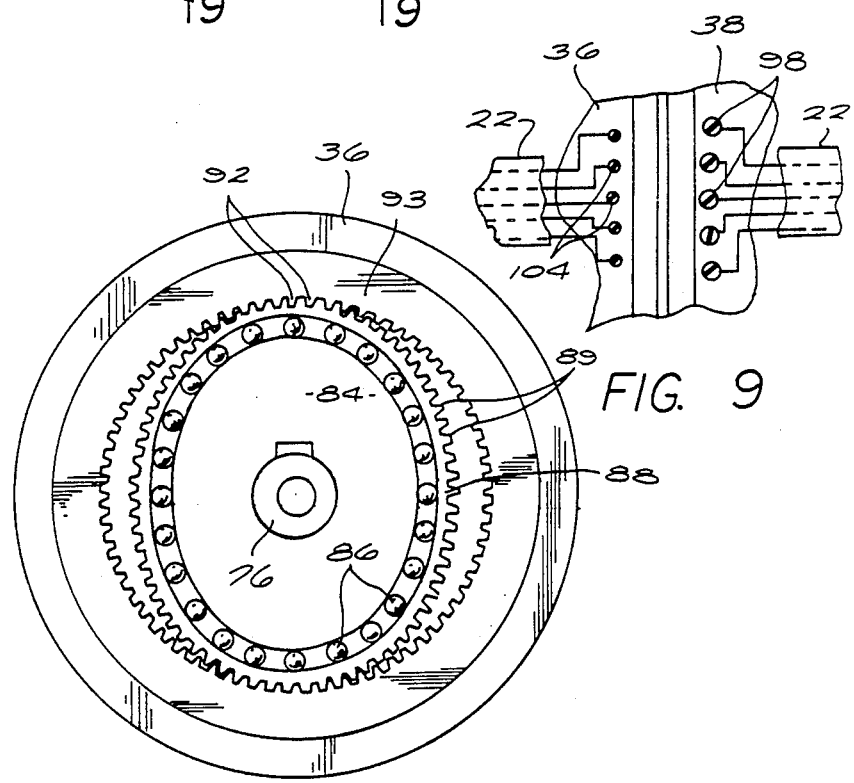
FIG. 9
FIG. 8

MODULAR ROBOTIC SYSTEM

BACKGROUND OF THE INVENTION

This invention relates generally to robotic systems for displacing an end effector or tool through a prescribed path of motion for automated performance, for example, of manufacturing processes and the like. More specifically, this invention relates to an improved robotic system of modular construction and a related method of operation wherein an end effector position signal is coupled to multiple movable members and individually interpreted to derive individualized component movements.

A variety of robotic mechanisms are known in the art particularly for use in automated performance of various manufacturing processes and the like. Such robotic mechanisms typically comprise an assembly of mechanical components, some of which are configured to accommodate displacement along or about preselected axes. The assembled components commonly comprise a mechanical linkage which supports a so-called end effector or tool for displacement through a desired path of motion. Such robotic mechanisms have been constructed with relatively simple geometries having, for example, one or two degrees of mechanical freedom to permit end effector motion through relatively simple paths. More complex system assemblies have also been proposed with higher degrees of mechanical freedom, for example, five or six degrees of freedom, to permit end effector displacement through more complex paths as may be required in the performance of complex manufacturing operations. In any case, the assembled robotic linkage normally includes drive motors arranged along the length of the mechanical linkage for individual actuation, typically under computer control, to obtain the desired end effector path of motion as a function of time.

In the past, robotic systems have generally comprised customized mechanical assemblies and related customized control systems which have been designed to accommodate a specific operating environment. Computer control systems for the robotic mechanism have been programmed for transmitting individual joint position signals in parallel to the various movable joints of the robotic linkage, resulting in relatively complex and typically custom-tailored control programs in addition to relatively complex wiring arrangements which can interfere with the desired linkage displacements. Efforts to produce a robotic mechanism from modular components adapted for assembly in different configurations to accommodate different paths of motion have still required complicated programming systems and related complex wiring arrangements for coupling individualized actuation signals to each movable joint.

There exists, therefore, a significant need for an improved robotic system particularly of the type which can be assembled from modular components, wherein each movable joint of the assembled linkage is adapted for individualized response to a common command signal, thereby permitting a simplified programming system and corresponding simplifications in coupling the command signals to a plurality of movable joints. The present invention fulfills these needs and provides further related advantages.

SUMMARY OF THE INVENTION

In accordance with the invention, an improved modular robotic system is provided with at least one robotic arm set having an end effector or tool for displacement through a prescribed path of motion. The arm set comprises an assembled array of modular passive members and active members for supporting the end effector with respect to a selected substrate, and in a manner providing a selected number of degrees of mechanical freedom. Each of the active members includes an on-board microprocessor for receiving an end effector position signal transmitted from a central processor. The microprocessor translates the end effector position signal and appropriately activates an associated drive motor for obtaining an individual displacement of the active member. The combination of displacements of the various active members displaces the end effector through the prescribed path of motion.

In accordance with a preferred form of the invention, the robotic system includes one or more of the robotic arm sets coupled to receive position command signals from the central processor. Each arm set comprises an assembled combination of modular connector components in selected sizes and shapes to provide a modular geometry for supporting the end effector or tool with respect to the substrate. Selected joint connectors comprise active members of the modular arm set with each joint connector having a driven member adapted for rotary motion about a selected axis, wherein the combination of rotary motions provided by a plurality of the joint connectors provides a selected number of degrees of freedom for end effector motion. The preferred joint connector comprises a base sleeve supporting the associated drive motor and a reduction gear assembly for rotatably driving a driven sleeve.

The central processor is programmed to transmit a succession of end effector position signals along a communications cable which is connected to each active joint connector of a robotic arm set. In this regard, in the preferred form, the communications cable extends along the assembled modular arm set from the substrate to the final active joint connector disposed closest to the end effector or tool. Slip ring conductors are provided between the interfitting base and driven sleeves of each active joint connector to permit unrestricted driven sleeve rotation in either rotational direction without interfering with communication cable interfaces.

The on-board microprocessors for the active joint connectors are commonly programmed for responding individually to unique translation data tables to translate or interpret the end effector position signal for purposes of activating the associated drive motor, as required to achieve the desired path of motion for the end effector. More particularly, the microprocessors of the various active joint connectors individually translate the end effector position signal resulting in a combination of joint connector displacements for moving the end effector through the desired overall path of motion. For extended movements, the central processor transmits a succession of end effector position signals which are responded to by the individual joint connectors to move the end effector through a succession of points in three dimensional space, thereby achieving the desired path of motion.

Each joint connector further includes sensor means for monitoring the actual response of the joint connector before and throughout displacement of the driven sleeve as commanded by the associated microprocessor. A preferred sensor means comprises a position sensor including an optical position encoder for detecting the actual position of the driven sleeve and for appropriately signaling the microprocessor to modify drive motor operation in a manner eliminating errors between the commanded and actual joint connector positions. In addition, the drive motor includes circuit means to reduce power stage heating and associated power loss, for reducing inductive switching transients.

In accordance with the method of operation of the robotic system, each robotic arm set is constructed from the modular components to accommodate the requisite path of motion of the end effector with the appropriate torque, speed, and physical reach. The assembled arm set is coupled via the communications cable to the central processor for communication therewith. The central processor uses the physical dimensions of the modular components to prepare unique translation date tables to be used respectively by the active joint connectors to translate end effector position signals into joint positions. These data tables are transmitted to each active joint connector via the communications cable and stored by the associated microprocessors for operational use. Thereafter, during normal operation of the robotic arm set, transmission of a succession of end effector position signals representing a succession of end effector destination points in three dimensional space are transmitted along the communications cable for individual response by the various joint connectors. Appropriate input of position commands to the central processor during a task oriented programming phase results in a succession of end effector position signals transmitted to the active joint connectors, wherein these position signals result in end effector displacement in increments along a desired path of motion. For each position, the microcontrollers at the active joint connectors respectively determine the corresponding positions of their associated joint connectors.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a schematic diagram illustrating a modular robotic system embodying the novel features of the invention and including plural robotic arm sets;

FIG. 2 is an enlarged fragmented perspective view depicting an exemplary modular robotic arm set;

FIG. 3 is an exemplary table of modular components for use in constructing the modular arm set of FIG. 2;

FIG. 4 is a diagrammatic representation depicting assembly of the modular arm set of FIG. 2 utilizing the component code represented in FIG. 3;

FIG. 5 is an exploded perspective view illustrating assembly of various modular components for use in constructing the robotic arm set;

FIG. 6 is an exploded perspective view illustrating assembly of further modular components;

FIG. 7 is an enlarged longitudinal sectional view depicting a preferred construction for an active joint connector for use in the robotic arm sets;

FIG. 8 is an end elevation view taken generally on the line 8—8 of FIG. 7;

FIG. 9 is an enlarged fragmented view taken generally of line 9—9 of FIG. 7;

DETAILED DESCRIPTION OF THE PREFERRED EMBODIMENT

Figure 10:
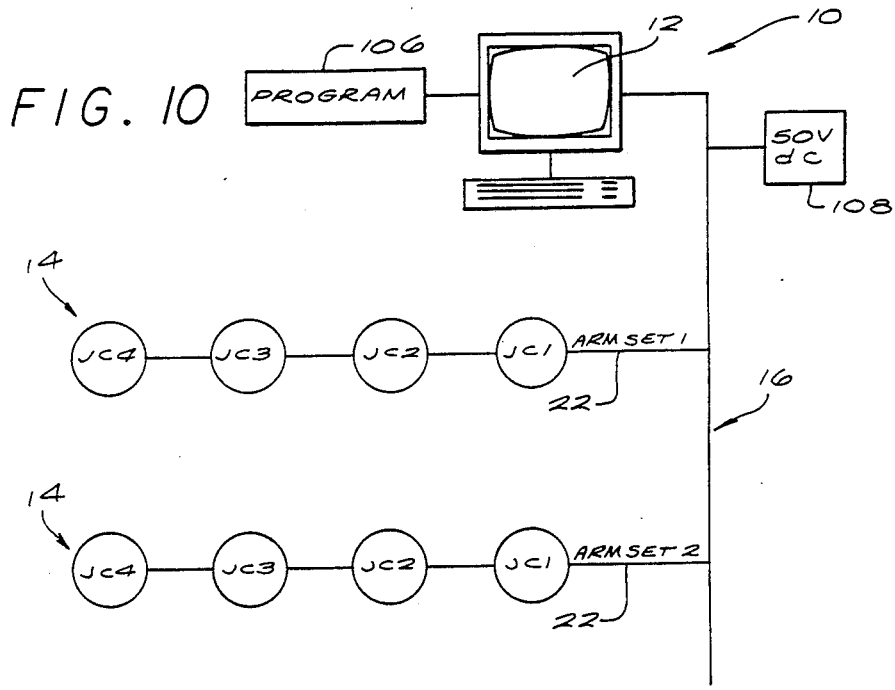
FIG. 10 is a diagrammatic representation illustrating the robotic system having multiple arm sets each including a plurality of active joint connectors.

As shown in the exemplary drawings, a modular robotic system in accordance with the present invention is referred to generally in FIG. 1 by the reference numeral 10. The system 10 includes a control station 12 such as a central processor of a modern personal computer station or the like for controlling the operation of one or more arm sets 14 of modular construction. The central processor 12 generates position signals coupled to each arm set 14 via a cable network 16. Each arm set includes one or more active joint members 18 having on-board microprocessor means (not shown in FIG. 1) for individually interpreting the position signals in a manner displacing an end effector or tool 20 through a predetermined path of motion in three dimensional space.

As shown in more detail in FIGS. 2-6, each arm set 14 is constructed from an assemblage of modular connector and linkage components which are designed to support the end effector or tool 20 for displacement through a predetermined path in three dimensional space to a designated target or destination position. In this regard, the joint connector and linkage components comprise a group of active and passive members, with the active members collectively providing a selected number of degrees of mechanical freedom such that the desired path of motion can be obtained. As will be described in more detail, the active joint members 18 of each arm set 14 are coupled serially to a common communications cable 22 of the cable network 16. Moreover, each active joint member 18 of each arm set 14 includes on-board microprocessor means for individually interpreting the position signals from the central processor 12. That is, the central processor 12 provides a generic position signal to all active joint members 18 of each modular arm set 14, with the active joint members individually interpreting the position signal to provide individualized joint member movements. The combination of joint member movements is effective to displace the associated end effector or tool 20 through the desired path of motion to the desired destination point in three dimensional space.

FIG. 3 constitutes a table of typical modular components which may be used in the construction of a custom designed arm set 14. As depicted in FIG. 3, the modular components include a combination of connector elements used to interconnect mechanical link elements. The connector elements and link elements are desirably provided in several basic configurations and in different physical sizes to permit customized construction of the arm set 14 for supporting an end effector or tool 20 relative to a substrate 24. Of the various connector elements and link elements tabulated in FIG. 3, the joint connector comprises the active joint member 18 which is installed at one or more points along the modular arm set to obtain the desired mechanical freedom of motion.

FIG. 2 illustrates an exemplary modular arm set 14 constructed from a plurality of connector elements and link elements to support the end effector or tool 20 relative to a substrate 24. FIG. 4 is a diagrammatic counterpart representing the assembled arm set of FIG. 2 in alphabetic code as identified in the table of FIG. 3. More specifically, with reference to FIGS. 2-4, a base link 26 is secured in any suitable manner to the substrate 24. The base link 26 is joined in turn by a sleeve-shaped ring connector 28 to an upstanding cylindrical straight link 30. The upper end of the straight link 30 is fastened in turn to an active joint connector 18 which is secured in turn to one end of an elbow link 32. These interconnected components are shown in exploded form in FIG. 5, with the active joint connector 18 including oppositely directed arrows 33 and 34 to represent rotational driving of an upper driven sleeve 36 relative to a lower base sleeve 38. Accordingly, operation of the joint connector 18 (FIG. 5) in response to a position signal from the central processor 12, as will be described, is effective to rotate the elbow link 32 about a generally vertical axis 39, thereby providing the arm set with the first degree of mechanical freedom. Of course, if desired, the joint connector 18 may be inverted for installation, or installed at other points in the mechanical system.

As shown further in FIGS. 2 and 4, the distal end of the elbow link 32 is coupled to a second active joint connector 18 followed by a second elbow link 40. This second joint connector provides a second degree of mechanical freedom in the form of rotation about an axis 41 oriented generally perpendicular to the vertical axis 39. The second elbow link 40 is secured by a ring connector 42 to a shorter straight link 44, which is coupled in turn via another ring connector 46 to a third elbow link 48. The elbow link 48 connects via a third joint connector 18 to another elbow link 50, with the third joint connector providing a third degree of rotation freedom relative to an axis 51. The elbow link 50 is connected by a change connector or size reducer fitting 52 to a straight link 54 of smaller diametric size. This straight link 54 is coupled by a fourth and final joint connector 18 of reduced diametric size to a tee link 58, with this final joint connector 18 being rotatable about an axis 59. The tee link 58 (FIGS. 2 and 6) is coupled in turn by means of another change connector 60 (FIG. 6) and a base link 62 to the tool 20. Accordingly, with four of the joint connectors 18 mounted along the arm set, this illustrative arm set 14 has four degrees of mechanical freedom.

FIGS. 7-9 illustrate one preferred construction for each active joint connector 18. Such joint connectors preferably comprise so-called harmonic gear drive units designed for large reduction ratios in a compact unit size capable of bidirectional driving operation with little or no backlash. Such harmonic drive units are individually known in the art and are commercially available, for example, from the Harmonic Drive Division of Emhart Machinery Group, Wakefield, Mass.

More specifically, with reference to FIGS. 7 and 8, a preferred harmonic drive unit includes the generally cylindrical base sleeve 38 having a drive motor 64 mounted therein. An outboard face or end of the base sleeve 38 includes an end wall 66 adapted to support electronic motor control and other processing components referred to generally by the reference numeral 68, and which will be described in more detail. The opposite axial end of the base sleeve 38 defines a support wall 70 for convenient rigid mounting of the drive motor 64 by means of mounting bolts 72 or the like. A central aperture 73 in the support wall 70 accommodates passage of a motor drive shaft 74 which is appropriately fastened by a key or the like (not shown) for rotatably driving an elongated drive sleeve 76. This drive sleeve 76, as will be described, transmits the rotary motion of the drive shaft 74 to the driven sleeve 36 which is rotatably supported by bearings 78 or the like relative to an inner support sleeve 80 joined to the support wall 70 of the base sleeve 38.

The drive sleeve 76 is adapted to rotatably drive the outer driven sleeve 36 by means of an harmonic drive reduction gear assembly 82. More specifically, the drive sleeve 76 has an outboard end keyed for rotational driving of a generally elliptical drive plate 84. The drive plate 84 is coupled by a peripheral array of bearing balls 86 to an outer flexspline 88 which includes outwardly presented gear teeth 89. As shown in the exemplary drawings, these gear teeth 89 of the flexspline 88 are located at the open end of a spline cup 90, the base of which is anchored by the mounting bolts 72 to the support wall 70. The flexspline gear teeth 89 are meshed generally at limited regions adjacent the major axis of the elliptical drive plate 84 with inwardly presented gear teeth 92 disposed in circular array on a ring gear 93 carried by the driven sleeve 36. Importantly, by providing a numerical mismatch between the numbers of gear teeth 89 and 92, such as a difference of one or two teeth, rotational driving of the motor drive shaft 74 results in rotational driving of the ring gear 93 on the driven sleeve 36 with a large speed reduction. The elliptical drive plate 84 functions as an elliptical wave generator to deform the flexspline 88 in a manner yielding slow rotation of the driven sleeve 36. The speed reduction rotation may proceed in either rotational direction, in accordance with operation of the drive motor 64, with little or no backlash since the gear teeth aligned with the major axis of the drive plate 84 are in substantially full engagement with each other at all times. Moreover, the joint connector 18 depicted in FIG. 7 is conveniently available in different diametric sizes and power capacities, thereby permitting use as the active member in a robotic arm set.

The base sleeve 38 and the driven sleeve 36 conveniently include at least portions thereof with a common diametric size, as depicted in FIG. 7. This arrangement permits installation along an arm set 14 in a reversible manner relative to adjacent arm set components as viewed, for example, in FIG. 5. Set pins 94 are provided with the base sleeve 38 and driven sleeve 36 for interlocking the components of the arm set together and for aligning their respective electrical connections, as will be described.

In accordance with one primary aspect of the invention, the base sleeve 38 and driven sleeve 36 include a slip ring coupling 96 adapted to accommodate series connection to the communications cable 22. More particularly, as shown best in FIGS. 7 and 9, the base sleeve 38 includes an array of outwardly exposed terminals 98 adapted for connection to individual conductors of the communications cable 22. These terminals 98 are electrically connected to a bank of slip ring conductors 100 located on the exterior of the support sleeve 80 in individual conductive relation with aligned slip ring contact brushes 102 on the driven sleeve 36. This latter set of slip ring contact brushes 102 are coupled electrically in turn to a second set of outwardly exposed terminals 104 on the driven sleeve 36. Accordingly, the communications cable 22 can be threaded directly along the components of each robotic arm set 14, with the communications cable 22 being coupled electrically and in series with the two sets of terminals 98 and 104. Importantly, the slip ring conductors coupled between the terminal sets for each joint connector 18 permits the driven sleeve 36 to rotate in either direction through any number of revolutions without disruption of the serial cable extension to joint connectors located distally, e.g., near the tool 20.

FIG. 10 schematically illustrates the overall system arrangement including the central processor 12 coupled via the cable network 16 to a pair of illustrated arm sets 14. The central processor 12 is appropriately programmed, as depicted by program block 106, to control commands transmitted to each arm set to undergo designated displacements as functions of time, and to monitor arm set performance or compliance with such commands. The cable network 16 includes a communications cable 22 for each arm set 14, wherein the communications cable 22 is threaded lengthwise along the assembled arm set components and is connected serially as previously described to the multiple active joint connectors 18 of each arm set. Importantly, one of the conductors of the cable network 16 may be coupled to an appropriate power source, such as a 50 volt dc power supply 108 for powering the drive motors 64 of the individual joint connectors.

Figure 11:
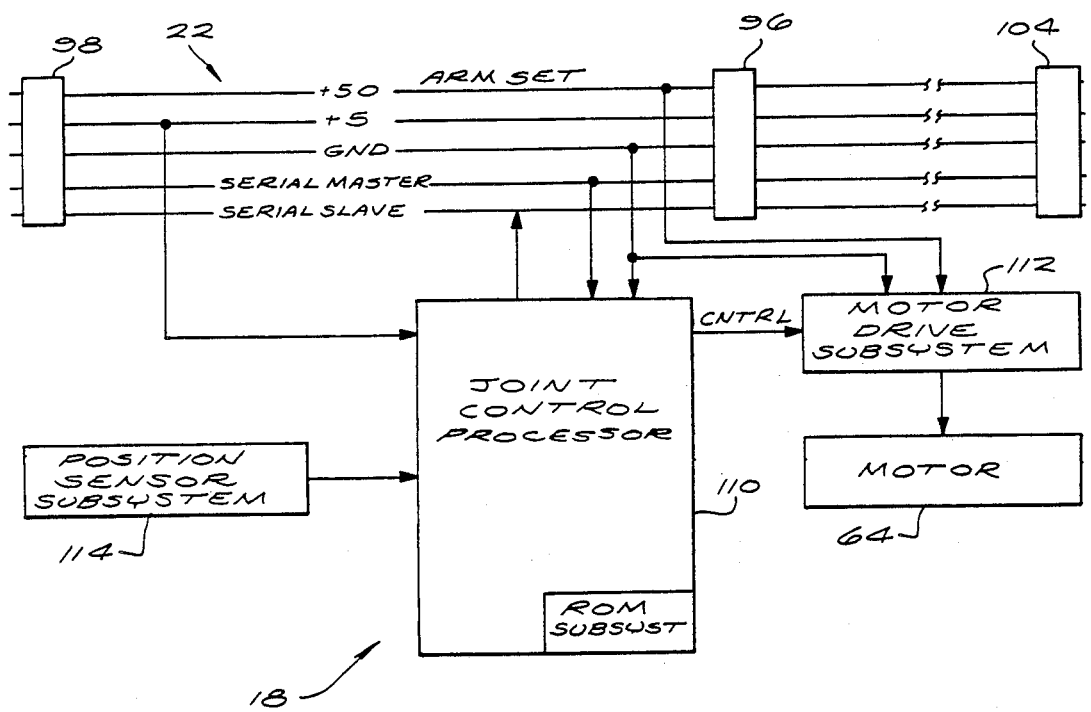
FIG. 11 is another schematic diagram illustrating interconnection between an active joint connector and a main communications cable.

FIG. 11 comprises a more detailed schematic diagram depicting the electrical coupling of a representative joint connector 18 to the associated communications cable 22. More particularly, the illustrative communications cable 22 includes five individual conductors which are appropriately coupled electrically to components of the joint connector 18 between the terminal sets 98 and 104 associated with that joint connector. As shown, a relatively low power source such as about five volts dc together with a ground line are coupled to a joint control processor 110, which comprises the on-board microprocessor means for the joint connector. The higher power source 108 for the drive motor 64 is coupled together with the ground line to a motor drive subsystem 112. The remaining two conductors comprise a serial master for transmitting position command signals to the joint control processor 110, and a serial slave for conveying responsive data back to the central processor 12. Conveniently, the processor system 110 and the motor drive subsystem 112 are mounted on-board relative to the associated joint connector by direct mounting onto the end wall 66 of the base sleeve 38 (FIG. 7).

The joint control processor 110 comprises, in the preferred form, a solid state component programmed for receiving a position command signal from the central processor 12 and for individually interpreting the command signal to power the associated drive motor 64 through a selected rotational increment and direction. As is known in the art, the processor 110 performs this function by referencing each position command signal against tabulated reference positions stored in the memory of the processor 110, with appropriate interpolative processes to yield the desired joint connector displacement within an acceptable range of error. The tabulated reference positions will be unique to each of the joint connectors in accordance with the physical design and work space requirements of the individual arm set 14, based upon mathematical modeling processes which are generally known and understood by those skilled in the art. A preferred solid state device for performing these functions comprises an Intel Microcontroller Model 8095 with an appropriate clock chip and ROM subsystem used in conjunction therewith. Alternately, an Intel Microprocessor Model 8096 with integrated ROM subsystem can be used.

Figure 12:
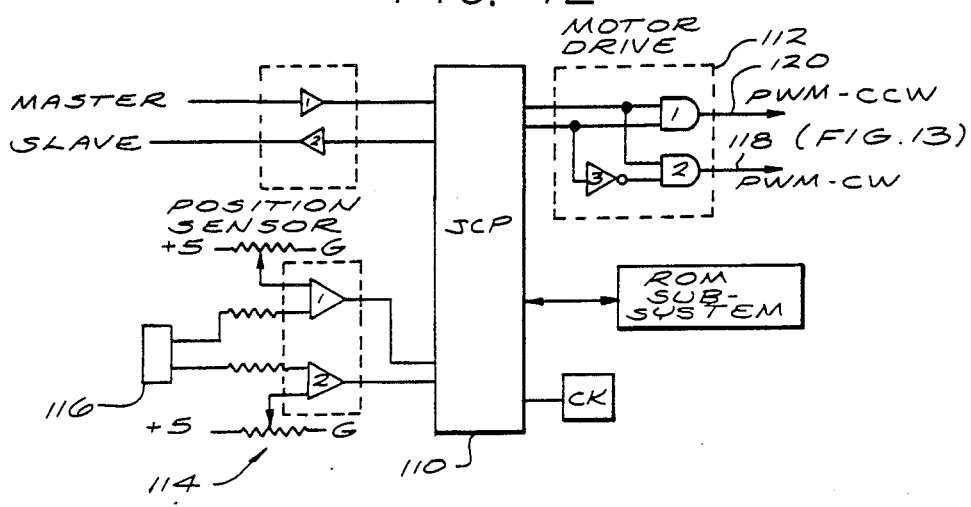
FIG. 12 is a schematic diagram illustrating further details of a microprocessor forming a portion of each active joint connector.

As depicted in FIGS. 11 and 12, the joint control processor 110 is associated with a position sensor 114 for providing a direct indication of actual joint connector displacement direction and magnitude. This position sensor 114 provides inputs to the processor 110 for feedback comparison between actual and commanded joint connector positions, and appropriate correction of actual position to minimize or eliminate operational errors. A preferred position sensor 114 comprises an optical detector 116 (FIG. 12) which can be mounted directly on the drive sleeve end wall 66 (FIG. 7) for monitoring drive shaft rotation, for example, by detecting rotation of an apertured disk (not shown) internal to the detector 16 and mounted on the drive shaft. The detector 116 provides a pair of output signals in quadrature as dual channel inputs to the processor 110, wherein these inputs cooperatively represent drive shaft position at any given point in time. Although a suitable optical detector may take various forms, one preferred detector construction comprises an opto-electronic pulse encoder such as the series 012H encoder marketed by MicroMo Electronics, Inc. of St. Petersburg, Fla.

Figure 13:
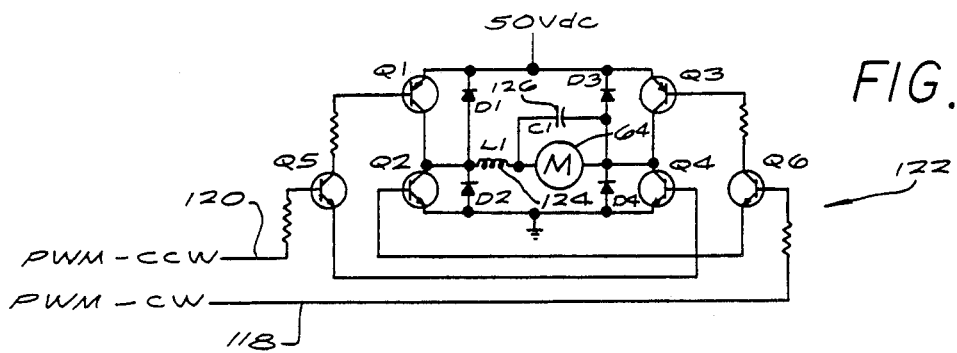
FIG. 13 is a circuit diagram representing a preferred motor power stage circuit for use in each active joint connector.

The joint control processor 110 responds to the position command signal as modified by actual position error correction to control the motor drive subsystem 112, as viewed in FIGS. 11-13. In this regard, the motor drive subsystem 112 comprises conventional pulse width modulation circuitry for providing an output on one of two motor conductors 118 and 120 coupled to a motor power stage circuit 122 (FIG. 13), in accordance with the desired direction of motor rotation. The duty cycle of the pulse width modulated signal is directly proportional to the desired motor speed, and is appropriately controlled by the joint control processor 110.

The preferred power stage circuit 122 shown in FIG. 13 includes a plurality of transistor switches connected for bidirectional switching of the drive motor 64 between the motor power supply and ground conductors of the communications cable 22. More specifically, when clockwise drive motor rotation is desired, the pulse width modulated motor control signal is applied to the conductor 118. This signal switches transistor "Q6" to a conductive state, resulting in a corresponding switching of transistors "Q2" and "Q3" to conductive states. When this occurs, with the remaining power stage transistors held nonconductive, the drive motor 64 is connected with the power supply 108 in a first direction for clockwise motor rotation. Alternately, when the pulse width modulated signal is applied to the counterclockwise conductor 120, the transistor "Q5" is switched to a conductive state to correspondingly switch transistors "Q1" and "Q4" to conductive states. This latter switching mode couples the drive motor 64 to the power supply in a reverse manner for opposite, couterclockwise motor rotation. Importantly, the power stage circuit 122 includes a low pass filter arrangement in the form of an inductor 124 and a capacitor 126 connected respectively in series and in parallel with the drive motor 64 to minimize radio frequency emissions, and to achieve smoother transitions in current flow. Pulse width modulated operation provides that the transistors "Q1" through "Q4" are either completely on or off, resulting in greatly reduced power losses due to transistor heating effects, etc. Such reduction in power losses at the circuit 122 beneficially permits the circuit to be mounted on-board the joint connector. Moreover, the circuit 122 includes blocking diodes D1-D4 to prevent transistor damage due to inductive switching transients.

Figure 14:
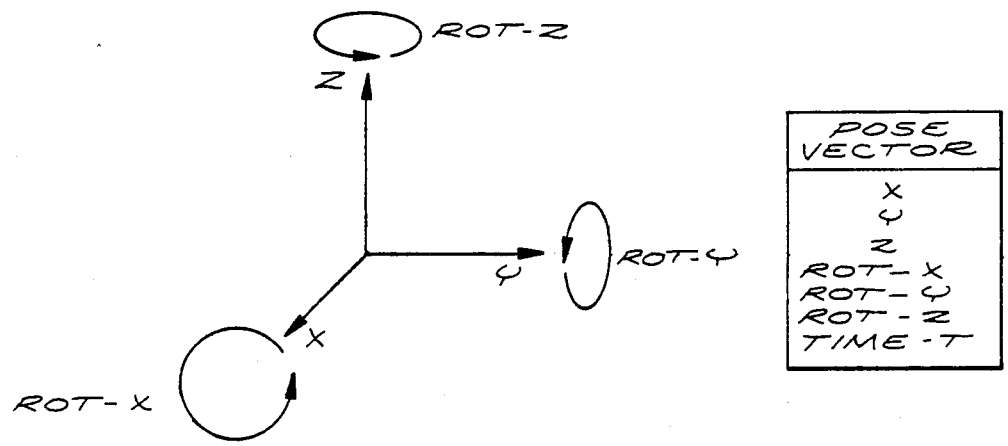
FIG. 14 is a schematic diagram representing reference frame and data elements of an end effector position signal transmitted to each of the active joint connectors.

In operation, as previously described, the central processor 12 functions to send typically a succession of position command signals along the communications cable 22 (FIG. 10) to the multiple active joint connectors 18 of each arm set 14. The position command signals each preferably provide elements of a pose vector (FIG. 14) in three-dimensional space coordinates indicating a destination point in space for the associated end effector or tool 20. The elements of the pose vector comprise positions from any selected reference point in Cartesian coordinates, as well as rotational orientation about the Cartesian axes. The pose vector also desirably includes a time factor for displacement.

Figure 15:
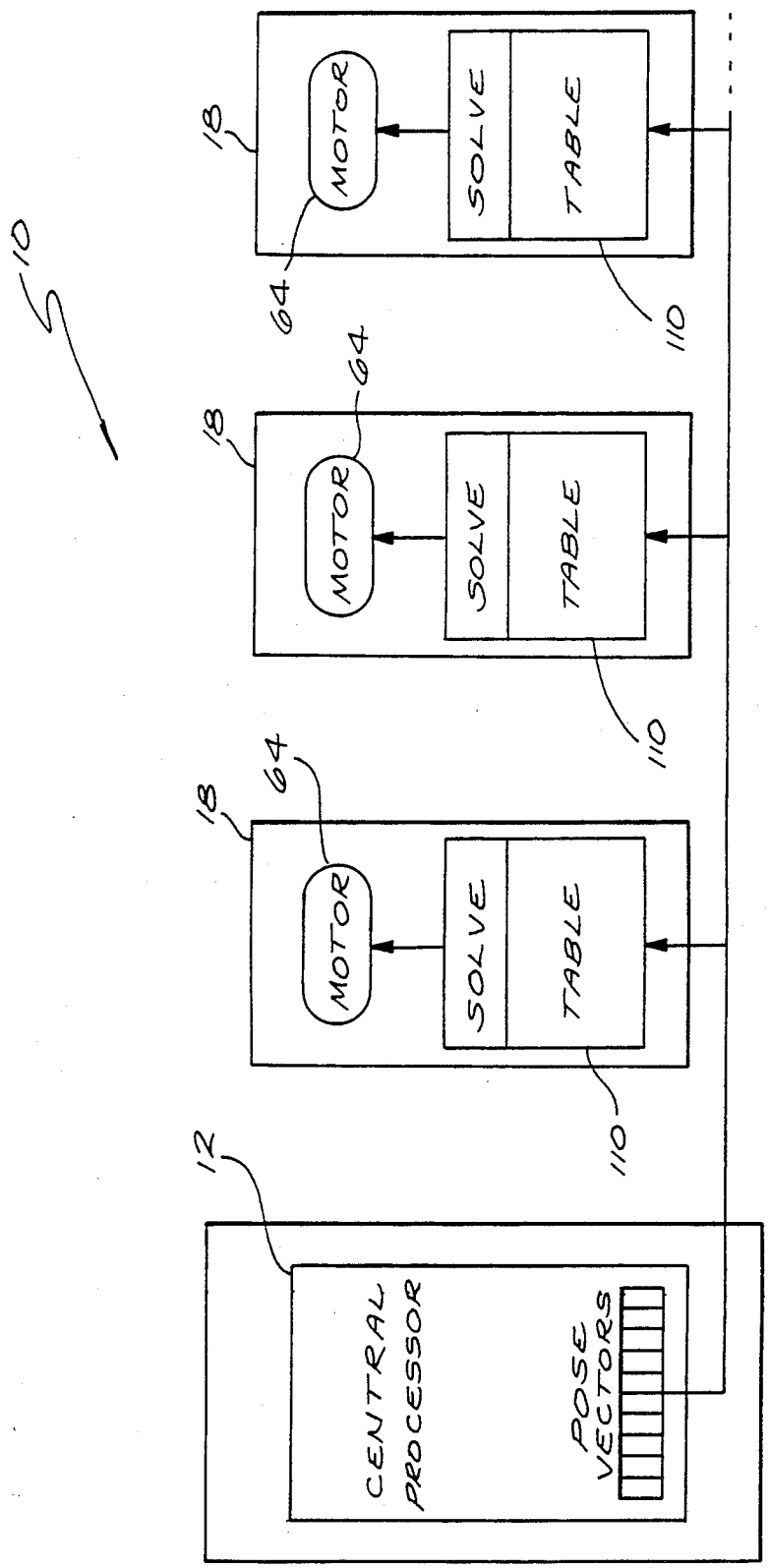
FIG. 15 is a schematic diagram representing further control aspects (i.e. real-time mathematical solution of arm control equations) of the microprocessor at each active joint connector.

The position command signal or signals are coupled to the joint control processors 110 of the active joint connectors 18. As represented generally in FIG. 15, the central processor 12 transmits the position command signals for reception by each processor 110 which is programmed to solve each position command signal in accordance with the tabulated array of positions or solutions unique to the particular joint connector. In this regard, during an initial setup phase, the control processor may be utilized to send position command signals to each arm set 14 for purposes of displacing the end effector or tool 20 through incremental steps spanning an intended work area in three-dimensional space. By instructing the joint connectors to proceed incrementally, the individual processors 110 of the joint connectors can plot and record in local memory their respective displacements responsive to particular pose vector commands. Alternately, these displacement values may be calculated in the central processor and transmitted as tabular data to the joint processors for local storage in memory. Subsequently, during normal arm set operation, the processors determine their individual displacements by reference to the respective memory position tables for prompt time function response to a position command signal. Importantly, the arm set responds entirely to position command signals representing destination tool position, without requiring individual joint connector commands. Moreover, individual joint connector response is obtained without requiring complex parallel interfaces or remote joint processor mountings.

A variety of modifications and improvements to the robotic joint system of the present invention will be apparent to those skilled in the art. For example, additional sensor response means may be provided, such as the imaging monitors 130 depicted in FIG. 1 to track actual tool movement and to provide appropriate feedback information to the central processor. Other types of sensors such as load sensors may also be provided, if desired. Accordingly, no limitation on the invention is intended by way of the foregoing description and accompanying drawings, except as set forth in the appended claims.

What is claimed is:

1. A modular robotic system for displacing an end effector through a prescribed path of motion, comprising:

an arm set defined by an assembled plurality of modular components including a plurality of active members each having a drive portion and a driven portion movable with respect thereto, said arm set being adapted to carry said end effector;

a control station including means for transmitting an end effector position signal;

cable means coupled between said control station and each of said active members for communicating said end effector position signal to said active members, said cable means being coupled to said active members; and microprocessor means mounted on-board each of said active members for receiving and interpreting said end effector position signal and for responding thereto to operate said drive portion for displacing said driven portion through an individualized displacement, whereby the combination of individual displacements of said driven portions of said active members displaces said end effector to a prescribed destination point;

said drive portion of each of said active members including a drive motor having an output shaft, and said driven portion of each of said active members comprises a driven sleeve coupled to said output shaft, and further wherein said microprocessor means is responsive to said end effector position signal to operate said drive motor to rotate said output shaft in a selected direction and magnitude.

2. The modular robotic system of claim 1 wherein said control station comprises a central processor of a computer.

3. The modular robotic system of claim 1 wherein said cable is mounted to extend along the assembled components of said arm set for serial connection to said active members.

4. The modular robotic system of claim 1 wherein each of said active members includes first and second terminal sets, and slip ring coupling means connected electrically between said terminal sets, said first and second terminal sets being adapted for series connection to said cable means.

5. The modular robotic system of claim 1 wherein each of said active members further includes speed reduction means coupled between said output shaft and said driven sleeve.

6. The modular robotic system of claim 5 wherein said speed reduction means comprises an harmonic gear drive unit.

7. The modular robotic system of claim 1 wherein each of said active members further includes means for monitoring the actual displacement thereof in response to the end effector position signal, and for comparing said actual displacement with said individualized displacement commanded by said microprocessor means, and for correcting said actual displacement for conformance with said individualized displacement.

8. The modular robotic system of claim 7 wherein said actual displacement monitoring means comprises a position sensor.

9. The modular robotic system of claim 8 wherein said position sensor monitors the rotational position of said output shaft.

10. The modular robotic system of claim 1 wherein said microprocessor means includes means for producing a motor drive signal and for coupling said motor drive signal to a power stage circuit for coupling electrical power to said drive motor, said power stage circuit having a low pass filter including an inductor coupled in series with said motor and a capacitor coupled in parallel with said motor.

11. A modular robotic system for displacing an end effector through a prescribed path of motion, comprising:

at least one arm set defined by an assembled plurality of modular components including a plurality of active members each having a drive portion and a driven portion movable with respect thereto, said arm set being adapted to carry said end effector;

a control station including means for transmitting an end effector position signal;

means for communicating said end effector position signal to said active members; and microprocessor means mounted on-board each of said active members for receiving and interpreting said end effector position signal and for responding thereto to operate said drive portion for displacing said driven portion through an individual displacement, whereby the combination of individual displacements of said driven portions of said active members displaces said end effector to a prescribed destination point;

said drive portion of each of said active members including a drive motor having an output shaft, and said driven portion of each of said active members comprises a driven sleeve coupled to said output shaft, and further wherein said microprocessor means is responsive to said end effector position signal to operate said drive motor to rotate said output shaft in a selected direction and magnitude.

* * * * *